(12) United States Patent
Nishimura

(10) Patent No.: US 8,285,815 B2
(45) Date of Patent: Oct. 9, 2012

(54) BROADCAST DATA RECEIVING APPARATUS AND METHOD OF CONTROLLING THE BROADCAST DATA RECEIVING APPARATUS

(75) Inventor: Hayato Nishimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 89 days.

(21) Appl. No.: 13/007,052

(22) Filed: Jan. 14, 2011

(65) Prior Publication Data

US 2011/0173293 A1 Jul. 14, 2011

(30) Foreign Application Priority Data

Jan. 14, 2010 (JP) ................................. 2010-006157

(51) Int. Cl.
*G06F 15/16* (2006.01)
(52) U.S. Cl. ........ 709/217; 709/216; 709/219; 709/228; 709/232; 709/248; 709/246; 709/203; 705/50; 717/104
(58) Field of Classification Search .................. 709/217, 709/216, 219, 228, 248, 232, 246, 203
See application file for complete search history.

(56) References Cited

U.S. PATENT DOCUMENTS

| | | | | |
|---|---|---|---|---|
| 6,557,037 B1 * | 4/2003 | Provino | ........................ | 709/227 |
| 7,337,217 B2 * | 2/2008 | Wang | ............................ | 709/217 |
| 7,349,967 B2 * | 3/2008 | Wang | ............................ | 709/227 |
| 7,962,325 B2 | 6/2011 | Tagata et al. | | |
| 2002/0183115 A1 * | 12/2002 | Takahashi et al. | .............. | 463/42 |
| 2007/0245299 A1 * | 10/2007 | Sung et al. | ..................... | 717/104 |
| 2009/0177786 A1 * | 7/2009 | Takahashi | ..................... | 709/228 |
| 2010/0011303 A1 | 1/2010 | Fujii | | |

FOREIGN PATENT DOCUMENTS

| | | |
|---|---|---|
| JP | 2001-290812 | 10/2001 |
| JP | 2006-121533 | 5/2006 |
| JP | 2006-254017 A | 9/2006 |
| JP | 2007-328428 A | 12/2007 |
| JP | 2008-107964 | 5/2008 |
| JP | 2008-257354 A | 10/2008 |
| WO | WO 2008-018284 | 2/2008 |

OTHER PUBLICATIONS

Japanese Office Action dated Apr. 19, 2011 for Japanese Application No. 2010-006157 filed on Jan. 14, 2010.
Japanese Office Action dated Oct. 4, 2011 for Japanese Application No. 2011-196099 filed on Sep. 8, 2011.

* cited by examiner

*Primary Examiner* — Jude Jean Gilles
(74) *Attorney, Agent, or Firm* — Knobbe, Martens, Olson & Bear, LLP

(57) ABSTRACT

According to one embodiment, a broadcast data receiving apparatus comprises a transmission/reception module, a storage module, and a control module. The transmission/reception module transmits and receives data to and from an external apparatus through a network. The storage module stores a plurality of html files. The control module configured to read an html file of a language from the first storage module. The language accords with a request received by the transmission/reception module from the external apparatus through the network. The control module controls the transmission/reception module, causing the same to transmit the html file, thus read, to the external apparatus through the network.

8 Claims, 9 Drawing Sheets

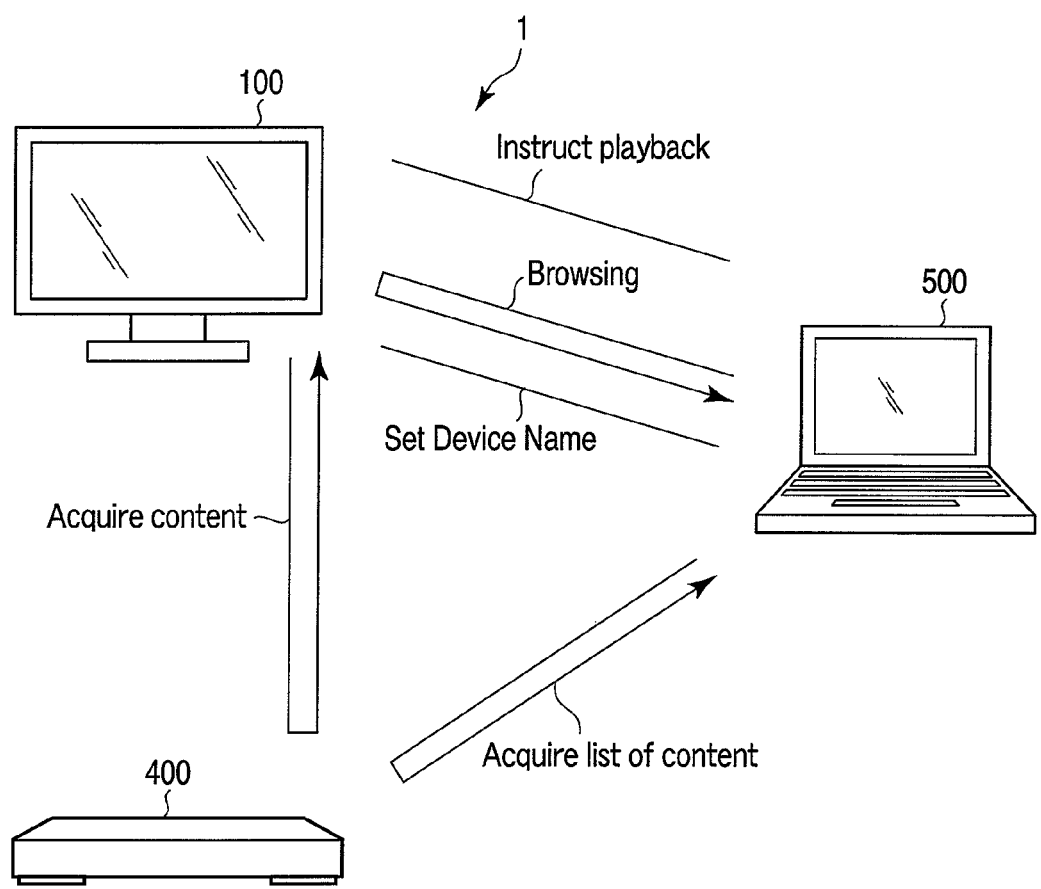
F I G. 1

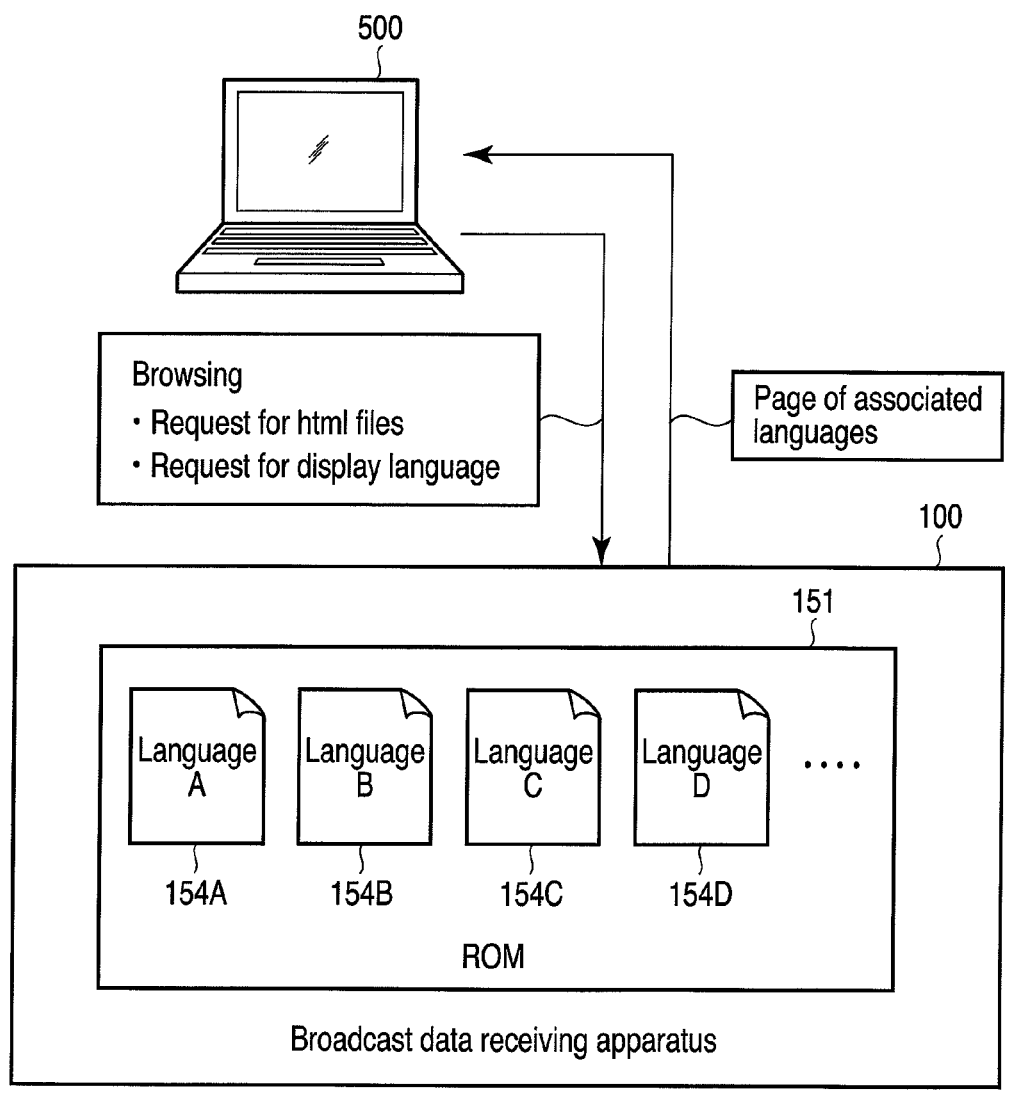
F I G. 13

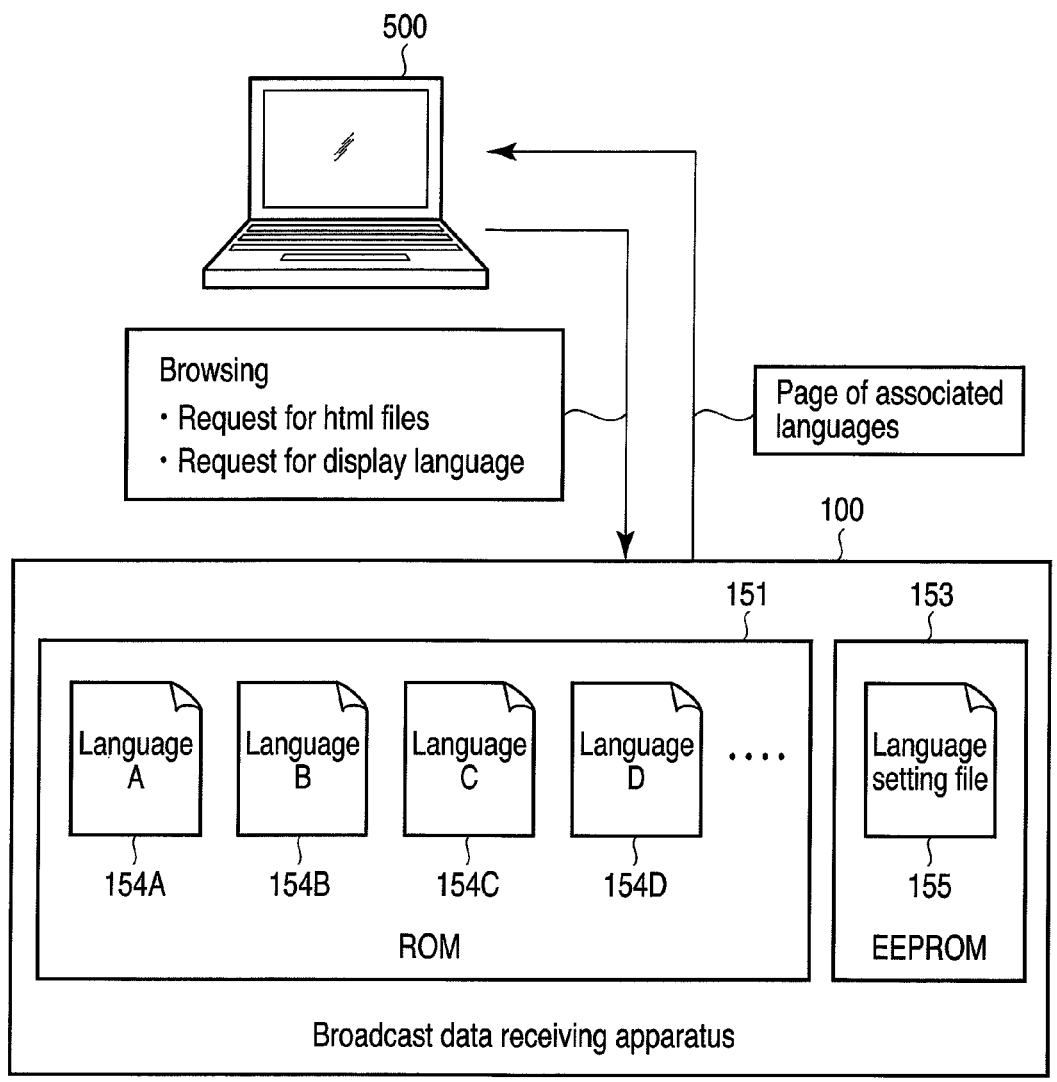
F I G. 14

BROADCAST DATA RECEIVING APPARATUS AND METHOD OF CONTROLLING THE BROADCAST DATA RECEIVING APPARATUS

CROSS-REFERENCE TO RELATED APPLICATIONS

This application is based upon and claims the benefit of priority from Japanese Patent Application No. 2010-006157, filed Jan. 14, 2010; the entire contents of which are incorporated herein by reference.

FIELD

Embodiments described herein relate generally to a broadcast data receiving apparatus designed to transmit and receive control signals and data to and from a plurality of other apparatuses, and to a method of controlling the broadcast data receiving apparatus.

BACKGROUND

The storage capacities of various data recording media have increased in recent years. Further, broadcast data receiving apparatuses, broadcast data recording apparatus (i.e., data record/playback apparatuses), etc., each having a data recording medium, are generally used in increasing numbers. The broadcast data receiving apparatus and the data record/playback apparatus record, in the recording medium, the compressed data representing contents (programs), each including video data and audio data (e.g., music data). As the recording medium, the broadcast data receiving apparatus and the data record/playback apparatus use, for example, a magnetic disk such as hard disk drive (HDD), a semiconductor memory device such as solid state drive (SSD), or an optical disk such as digital versatile disk (DVD).

Further, the communication network technology has advanced in recent years, and LANs have been provided in offices and houses in increasing numbers.

For example, Jpn. Pat. Appln. KOKAI Publication No. 2006-254017, which is a Japanese patent document, describes a television receiver that distributes html contents to the personal computer (PC) connected to it.

Moreover, Jpn. Pat. Appln. KOKAI Publication No. 2007-328428, another Japanese patent document, describes a computer system having a plurality language master data item for each data item to display, so that the data item may be displayed in the language of the user.

In order to enable a plurality of apparatuses to share contents, various guidelines are available, including digital living network alliance (DLNA). If a LAN connects apparatuses compatible with DLNA are connected to one another, these apparatuses can share contents.

The apparatuses that constituted a DLNA network are, for example, a digital media server (DMS), a digital media player (DMP), a digital media controller (DMC), and a digital media renderer (DMR).

The DMS is, for example, a hard disk recorder or a PC. The DMS stores and distributes digital contents. The DMP is, for example, a display such as a television receiver, or an audio player. The DMP plays back any content it has acquired from the DMS.

The DMC is, for example, a mobile terminal. The DMC controls the DMR, causing the same to play back any content stored in the DMS.

The DMR is, for example, a display such as a television receiver, or an audio player. The DMR acquires content from the DMS in accordance with an instruction coming from the DMC, and plays back the content.

Each of the apparatuses described above can hold its name (i.e., device name). Each apparatus that performs a DLNA function may designate the device name of any other apparatus desired, and can access the other apparatus.

For example, the DMC may designate the device name of the DMR to access the DMR. The DMC may send the device name of the DMS and a content name to the DMR to make the DMR to play back a desired content.

An function of changing the device name of another apparatus has been put to practical use. For example, the DMC acquires an html file from the DMR in order to change the device name of the DMR. The DMC opens the html file it has acquired, and then displays a name-changing page so that the device name of the DMR may be changed. In accordance with the contents of the page, the user operates the DMC, changing the device name of the DMR.

However, if the language the user of the DMC and DMR differs from the language of the name-changing page the DMC displays, the user may not understand the contents of the page that is designed to change the DMR device name the DMC is displaying.

Jpn. Pat. Appln. KOKAI Publication No. 2007-328428 discloses no specific configurations that enable any one of apparatuses connected by a network to receive an html file from any other apparatus to display a name-changing page. Consequently, data may not be displayed in the language the user can understand.

BRIEF DESCRIPTION OF THE DRAWINGS

A general architecture that implements the various feature of the invention will now be described with reference to the drawings. The drawings and the associated descriptions are provided to illustrate the embodiments and not to limit the scope of the invention.

FIG. 1 is an exemplary view for explaining the configuration of a network according to an embodiment;

FIG. 13 is an exemplary view for explaining a method of controlling the broadcast data receiving apparatus according to the embodiment; and FIG. 14 is an exemplary view for explaining another method of controlling the broadcast data receiving apparatus according to the embodiment.

DETAILED DESCRIPTION

Various embodiments will be described hereinafter with reference to the accompanying drawings. In general, according to one embodiment, a broadcast data receiving apparatus comprises a transmission/reception module, a storage module, and a control module. The transmission/reception module transmits and receives data to and from any external apparatus through a network. The storage module stores a plurality of html files. The control module reads an html file of the language according to a request the transmission/reception module has received from the external apparatus through the network, and controls the transmission/reception module, causing the same to transmit the html file, thus read, to the external apparatus through the network.

A broadcast data receiving apparatus according to one embodiment and a method of controlling the broadcast data receiving apparatus will be described in detail, with reference to the accompanying drawings.

FIG. 1 is a view for explaining the configuration of a network 1 according to the embodiment.

As shown in FIG. 1, the network 1 comprises a broadcast data receiving apparatus 100, a data record/playback apparatus 400, and a personal computer (PC) 500. Assume that the broadcast data receiving apparatus 100, data record/playback apparatus 400 and PC 500 are all compatible with the DLNA function.

The broadcast data receiving apparatus 100 functions as DMR. The data record/playback apparatus 400 function as DMS. The PC 500 functions as DMC.

The PC 500, which is used as DMC, acquires a list of the contents stored in the DMS. Further, the PC 500 acquires an html file from the broadcast data receiving apparatus 100 in accordance with the user's operation, in order to change the device name of the broadcast data receiving apparatus 100. The PC 500 opens the html file, displaying (browsing) a name-changing page so that the device name of the broadcast data receiving apparatus 100 may be changed.

Based on the user's operation, the PC 500 can sets a new device name for the broadcast data receiving apparatus 100. The broadcast data receiving apparatus 100 stores the device name transmitted from the PC 500, in a nonvolatile memory incorporated in the broadcast data receiving apparatus 100.

The PC 500 further instructs the broadcast data receiving apparatus 100 functioning as DMR, to play back the contents stored in the DMS.

The data record/playback apparatus 400 functioning as DMS is constituted by, for example, a hard disk recorder or a PC. The data record/playback apparatus 400 stores digital contents.

The broadcast data receiving apparatus 100 functioning as DMR acquires any content from the data record/playback apparatus 400 in accordance with the playback instruction received from the PC 500, and then plays back the content thus acquired.

Figure 2:
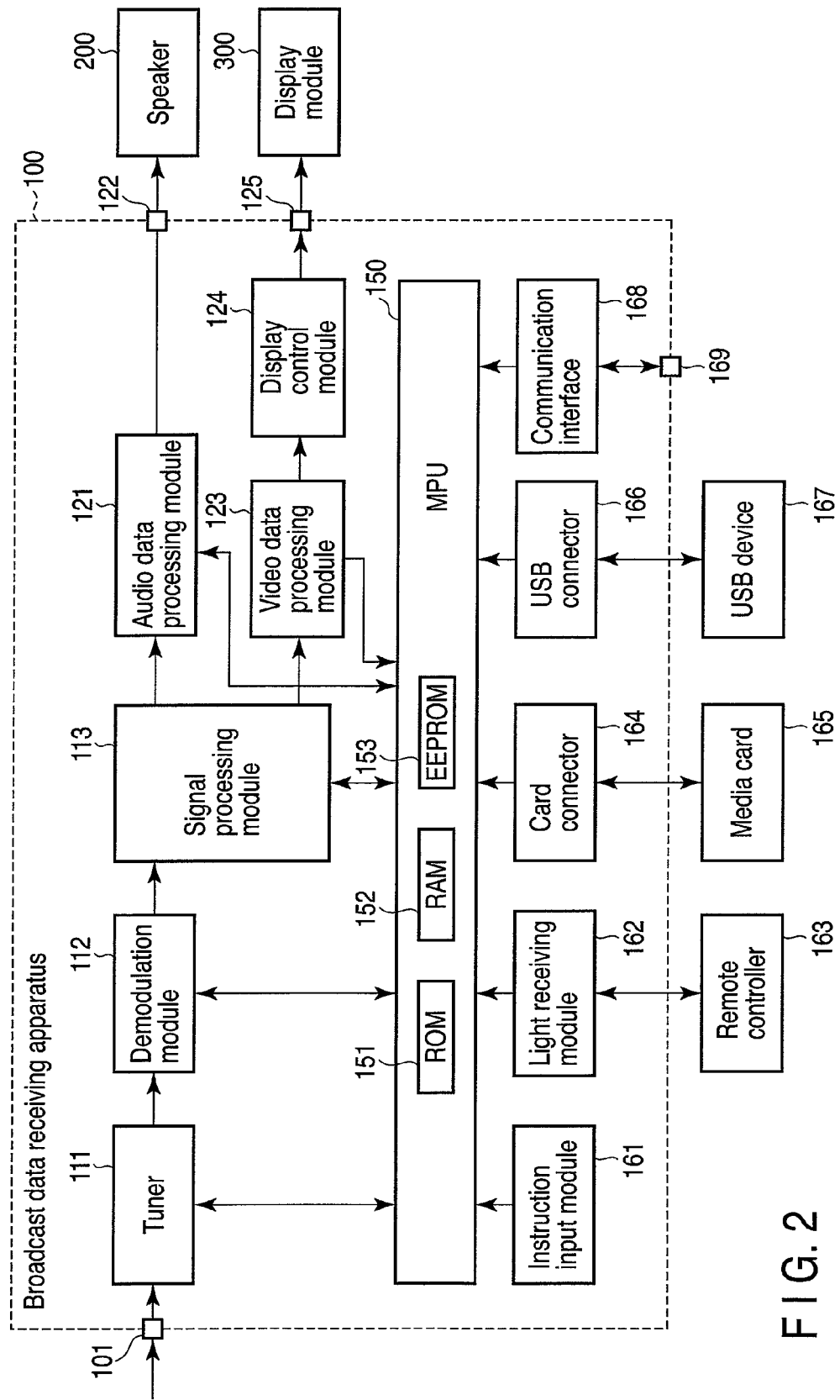
FIG. 2 is an exemplary view for explaining the broadcast data receiving apparatus according to an embodiment.

FIG. 2 is a block diagram for explaining the broadcast data receiving apparatus 100 shown in FIG. 1.

The broadcast data receiving apparatus 100 comprises an input terminal 101, a tuner 111, a demodulation module 112, a signal processing module 113, an audio data processing module 121, an audio data output terminal 122, a video data processing module 123, a display control module 124, a video data output terminal 125, an MPU 150, an instruction input module 161, a light receiving module 162, a card connector 164, a USB connector 166, and a communication interface 168. The MPU 150 has a ROM 151, a RAM 152 and an EEPROM 153.

The input terminal 101 receives, for example, a digital broadcast signal, which is supplied to the tuner 111. The tuner 111 performs tuning on the digital broadcast signal supplied from the input terminal 101. The digital broadcast signal, thus turned, is transmitted to the demodulation module 112. The demodulation module 112 demodulates the digital broadcast signal it has received. The digital broadcast signal, thus demodulated, is input to the signal processing module 113. That is, the input terminal 101, tuner 111 and demodulation module 112 cooperate, functioning as a reception module for receiving broadcast signals.

The signal processing module 113 functions as a signal processing module for processing broadcast signals. The signal processing module 113 processes any digital broadcast signal it has received from the demodulation module 112. More precisely, the signal processing module 113 splits the digital broadcast signal into a video signal and an audio signal. The signal processing module 113 supplies the audio signal to the audio data processing module 121, and the video signal to the video data processing module 123.

The audio data processing module 121 receives the audio signal from the signal processing module 113 and converts the signal to an audio signal. The audio signal has such a format that a speaker 200 may generate sound from it. The audio signal of this format is output from the audio data output terminal 122 to the speaker 200, which generates sound from the audio signal.

Meanwhile, the video data processing module 123 converts the video signal received from the signal processing module 113, to a video signal of such a format that a display module 300 can generate an image from it. The video signal of this format is output to the display control module 124. Controlled by the MPU 150, the display control module 124 generates from the video signal an OSD signal for displaying a graphical user interface (GUI) menu. Further, the display control module 124 performs an OSD process, superimposing the OSD signal on the video signal received from the video data processing module 123 and thereby generating a video signal so processed. This video signal is output from the video data output terminal 125 to the display module 300.

The display module 300 is a display module constituted by, for example, a liquid crystal display. The display module 300 displays the image represented by the video signal it has received.

The speaker 200 and the display module 300 may be formed integral with the broadcast data receiving apparatus 100. If the speaker 200, display module 300 and broadcast data receiving apparatus 100 are integrated, the audio data output terminal 122 and video data output terminal 125 can be dispensed with.

The MPU 150 functions as a control module for controlling the other components of the broadcast data receiving apparatus 100. The MPU 150 comprises an operation element such as a CPU and storage elements such as a ROM 151, a RAM 152 and an EEPROM 153. The MPU 150 performs various processes in accordance with operating signals supplied from the instruction input module 161.

The ROM 151 stores the system control program designed for the broadcast data receiving apparatus 100, and also various process programs. Further, the ROM 151 stores the default device name (default name) of the broadcast data receiving apparatus 100. In accordance with an operating signal supplied from the instruction input module 161, the MPU 150 activates the programs stored in the ROM 151, thereby controlling the other components of the broadcast data receiving apparatus 100.

The RAM 152 functions as work memory for the CPU. The EEPROM 153 is a nonvolatile memory that stores various preset data items. The preset data items include the device name of the broadcast data receiving apparatus 100.

The instruction input module 161 has various operation keys. As the user operates the keys, the instruction input module 161 generates operating signals. The operating signals are supplied to the MPU 150.

The light receiving module 162 has a sensor that can receive operating signals from, for example, a remote controller 163. The light receiving module 162 supplies any operating signal it has received, to the MPU 150.

The card connector 164 is an interface configured to perform communication with a media card 165 that stores moving image contents, still image contents or audio contents. The card connector 164 reads contents from the media card 165 connected to it, and supplies the contents to the MPU 150.

The USB connector 166 is an interface configured to perform communication with a USB device 167. The USB connector 166 receives signals supplied from the USB device 167 connected to it, and supplies these signals to the MPU 150. The USB device 167 may be an input device such as a keyboard. In this case, the USB connector 166 receives operating signals from the USB device 167. The USB connector 166 supplies the operating signals to the MPU 150. The MPU 150 performs various processes in accordance with the operating signals it has received from the USB connector 166.

The communication interface 168 is a transmission/reception module for transmitting and receiving data to and from an external apparatus through the network 1. The communication interface 168 transfers data between the MPU 150 and the apparatus connected to a communication terminal 169. The communication terminal 169 is constituted by, for example, a LAN terminal. The communication interface 168, which is incorporated in the broadcast data receiving apparatus 100, is connected by the communication interface 168 to the data record/playback apparatus 400 and PC 500, both shown in FIG. 1. The communication interface 168 may be connected to a wireless LAN to perform communication with any apparatus other than the apparatus 400 and PC 500.

The broadcast data receiving apparatus 100 sets a device name in order to perform communication with any apparatus connected to the communication interface 168 via the communication terminal 169. To set the device name, the broadcast data receiving apparatus 100 has a function (i.e., first device name setting module) and another function (i.e., second device name setting module). The first device name setting module is configured to set a device name on the basis of an operating signal the user has input to the broadcast data receiving apparatus 100. The second device name setting module is configured to set a device name on the basis of data received from the PC 500 that function as DMC.

The first device name setting module will be described at first. To input a particular operating signal, the MPU 150 of the broadcast data receiving apparatus 100 controls the display module 300, causing the same to display a window 311 of "Media Renderer Setup," which is shown in FIG. 3.

Figure 3:
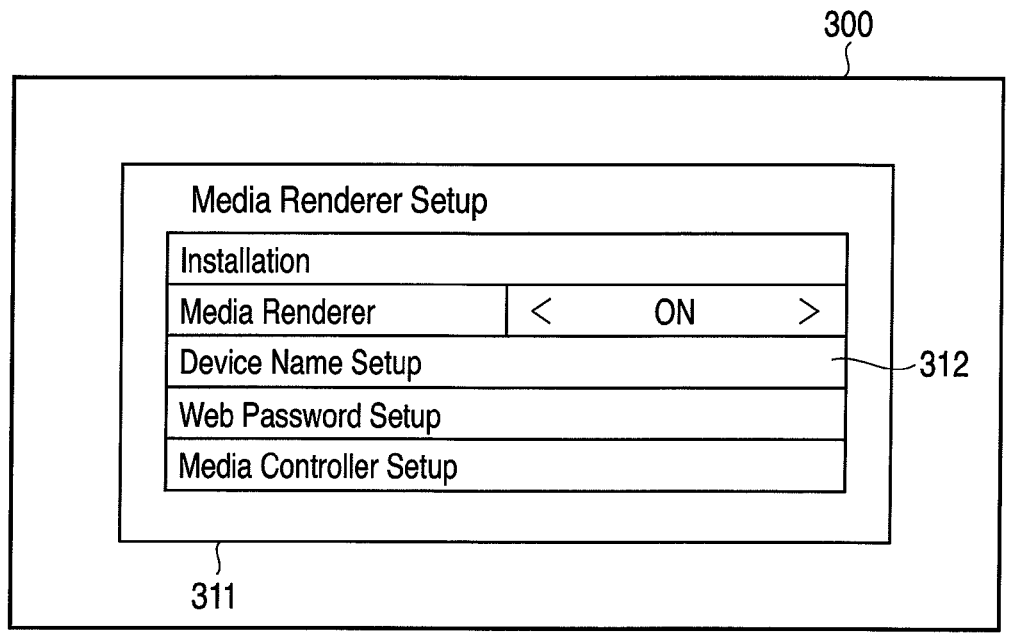
FIG. 3 is an exemplary view for explaining a device-name setting process performed in the broadcast data receiving apparatus according to the embodiment.

More specifically, the MPU 150 causes the display module 300 to display menu items such as "Installation," "Media Renderer," "Device Name Setup 312," "Web Password Setup" and "Media Controller Setup" in the "Media Renderer Setup" window 311 as shown in FIG. 3.

The user may select "Device Name Setup 312" in the window 311. In this case, the MPU 150 controls the display module 300, causing the same to display "Device Name Setup" window 321 shown in FIG. 4.

Figure 4:
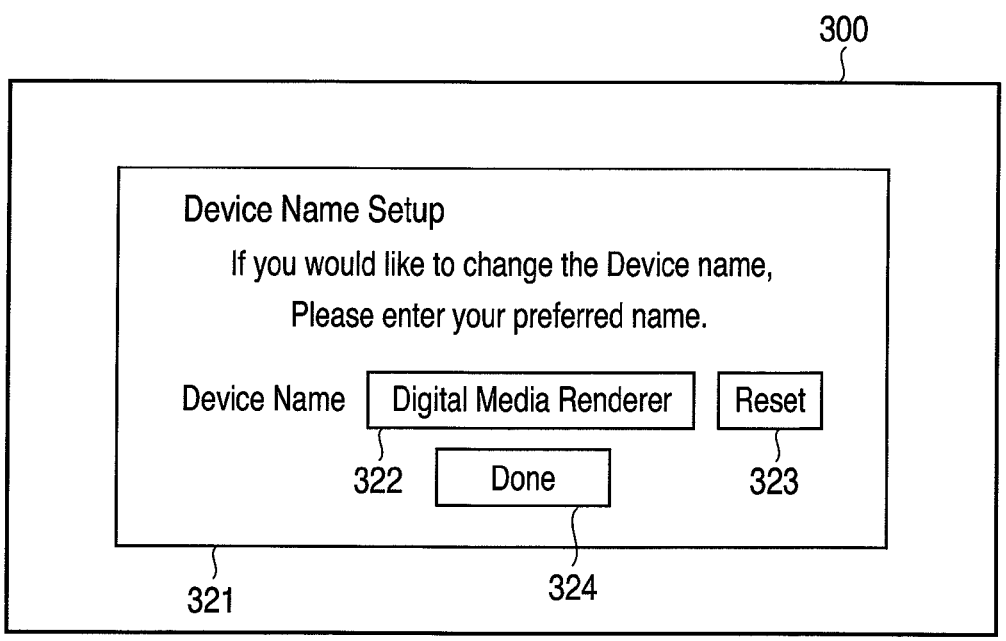
FIG. 4 is an exemplary view for explaining a different device-name setting process performed in the broadcast data receiving apparatus according to the embodiment.

The MPU 150 causes the display module 300 to display an input column 322, a "Reset" button 323, a "Done" button 324, etc. in the "Name Setup" window 321, as illustrated in FIG. 4. In this case, the MPU 150 makes the display module 300 displays a device name stored in the EEPROM 153. In the instance of FIG. 4, character data "Digital Media Renderer," which is default data, is input in the input column 322.

The user may select the "Reset" button 323. If this is the case, the MPU 150 erases the character data from the input column 322. If the "Done" button 324 is selected, the MPU 150 performs a control to register the character data in the input column 322, as device name. That is, the MPU 150 saves the character data in the input column 322, as device name, in the EEPROM 153.

If the user selects, for example, the input column 322, the MPU 150 will input, in the input column 322, the character data that the user has input. In this case, the broadcast data receiving apparatus 100 acquires the character data the user has input by operating the keyboard connected to the USB connector 166 or the software keyboard displayed by the display module 300.

Figure 5:
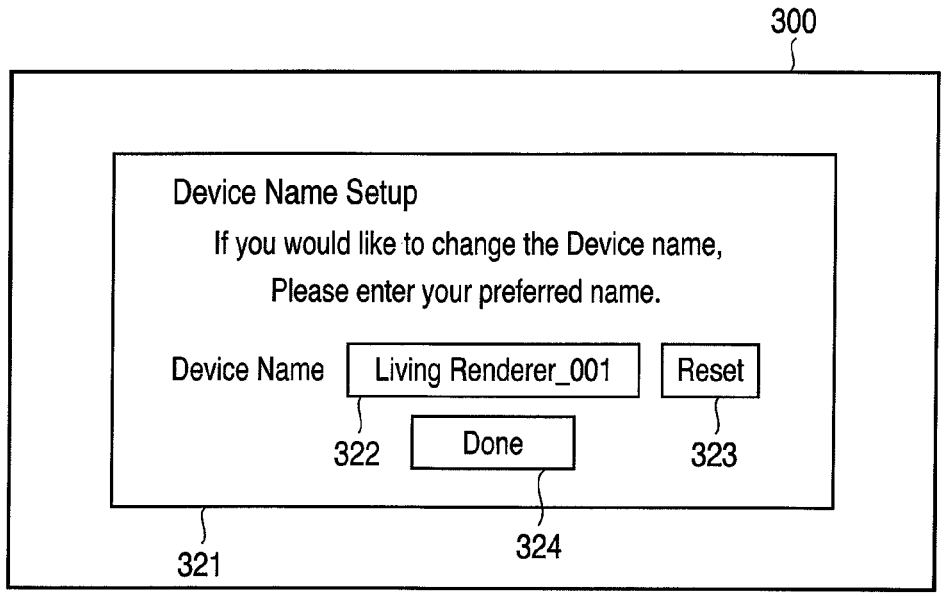
FIG. 5 is an exemplary view for explaining another device-name setting process performed in the broadcast data receiving apparatus according to the embodiment.

FIG. 5 is a view explaining how to change the character data displayed in the input column 322. As FIG. 5 shows, character data "Living Renderer_001" is input in the input column 322. In this state, the "Done" button 324 may be selected. Then, the MPU 150 saves the character data "Living Renderer_001," as device name, in the EEPROM 153. Thus, the broadcast data receiving apparatus 100 can set a device name in accordance with an operating signal the user has input.

The second device name setting module will be now described. When a particular operating signal is input, the PC 500 transmits, to the broadcast data receiving apparatus 100, a request for an html file in order to change the device name of the broadcast data receiving apparatus 100.

On receiving the request for an html file, the broadcast data receiving apparatus 100 transmits the html file stored in the ROM 151, to the PC 500 through the network 1. Further, the present device name stored in the EEPROM 153 is read and transmitted to the PC 500 through the network 1. Moreover, the default name stored in the ROM 151 is transmitted to the PC 500 through the network 1.

Figure 6:
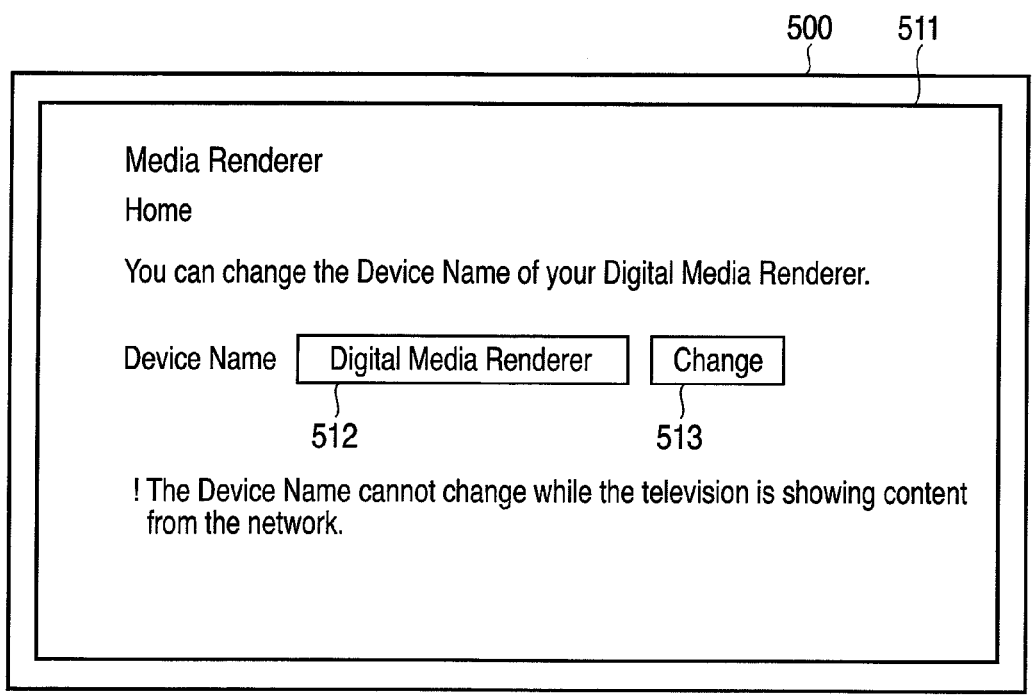
FIG. 6 is an exemplary view for explaining still another device-name setting process performed in the broadcast data receiving apparatus according to the embodiment.

The PC 500 opens the html file it has received, and controls the display module, causing the same to display a "Home" window 511 shown in FIG. 6.

As shown in FIG. 6, the PC 500 displays a device-name display column 512, a "Change" button 513, etc. in the "Home" window 511. In this case, the device name the PC 500 has received from the broadcast data receiving apparatus 100 is displayed in the device-name display column 512. In the instance of FIG. 6, character data "Digital Media Renderer," which is default data, is input in the device-name display column 512.

Figure 7:
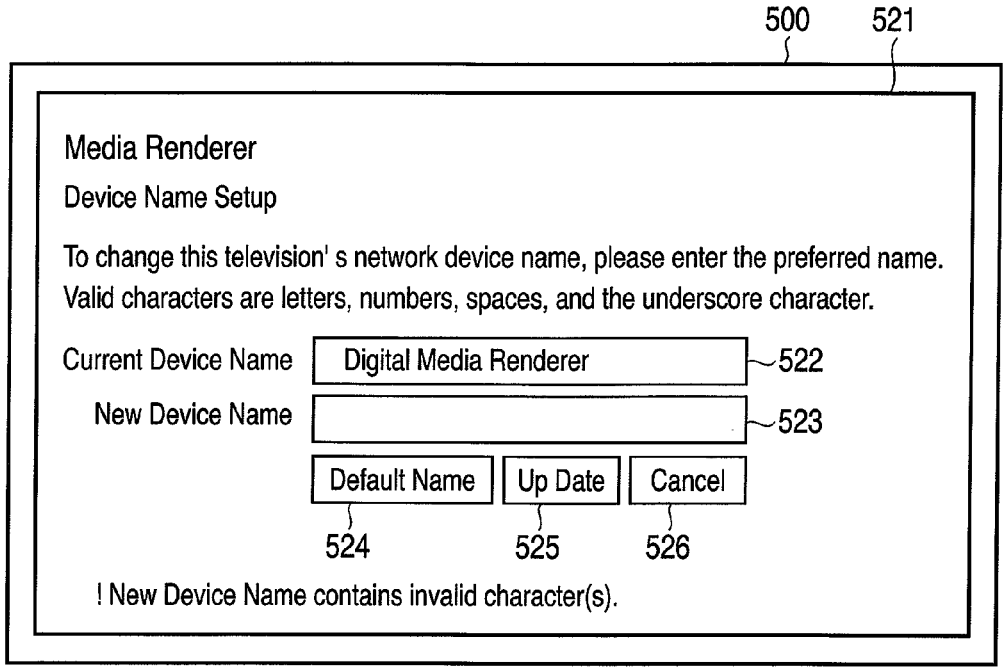
FIG. 7 is an exemplary view for explaining a further device-name setting process performed in the broadcast data receiving apparatus according to the embodiment.

If the "Change2 button 513 is selected, the PC 500 will display a "Device Name Setup" window 521 shown in FIG. 7.

As shown in FIG. 7, the PC 500 displays a device-name column 522, an input column 523, a "Default Name" button 524, an "Up Date" button 525, a "Cancel" button 526, etc. in the "Device Name Setup" window 521.

The device-name column 522 is a column in which to display the present device name of the broadcast data receiving apparatus 100. The PC 500 displays the device name received from the broadcast data receiving apparatus 100, in the device-name column 522.

The input column 523 is a column for inputting a device name to which the present device name of the broadcast data receiving apparatus 100 should be changed. If the user selects the input column 523, PC 500 will input the character data the user has input, in the input column 523.

If the "Default Name" button 524 is selected, the PC 500 will erase the character data from the input column 523 and will input the default name received from the broadcast data receiving apparatus 100, in the input column 523.

If the "Up Date" button 525 is selected, the PC 500 will perform a control to register, as device name, the character data in the input column 523. That is, the PC 500 transmits the character data in the input column 523 to the broadcast data receiving apparatus 100. In the broadcast data receiving apparatus 100, the MPU 150 saves this character data, as device name, in the EEPROM 153.

If the "Cancel" button 526 is selected, the PC 500 will interrupt the device-name setting process, and will control the display module, causing the same to display the "Home" window 511 shown in FIG. 6.

Figure 8:
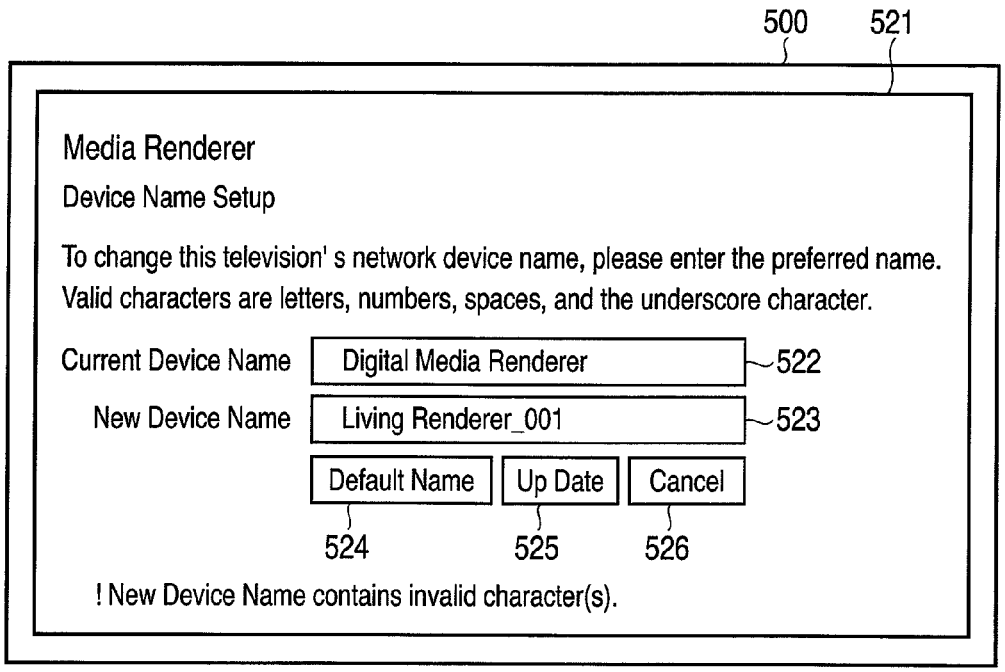
FIG. 8 is an exemplary view for explaining another device-name setting process performed in the broadcast data receiving apparatus according to the embodiment.
Figure 9:
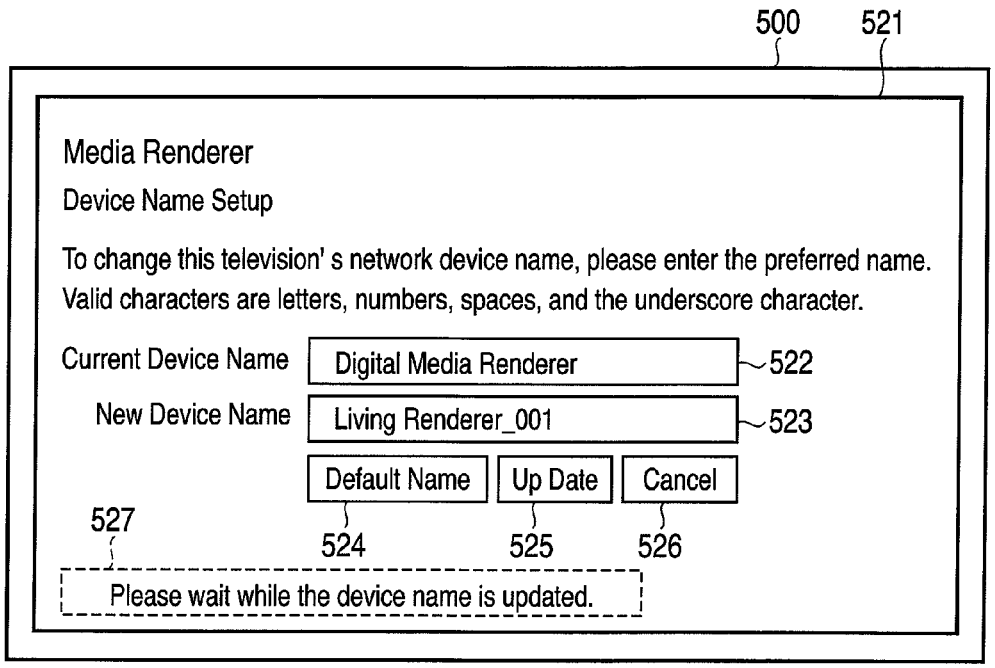
FIG. 9 is an exemplary view for explaining still another device-name setting process performed in the broadcast data receiving apparatus according to the embodiment.

FIG. 8 is a view explaining how to change the character data in the input column 523 in accordance with an operating signal the user has input. As FIG. 8 shows, character data "Living Renderer_001" is input. If the "Up Date" button 525 is selected in this state, the PC 500 will transmit the character data "Living Renderer_001" in the input column 523, to the broadcast data receiving apparatus 100. In this case, the PC 500 displays, as shown in FIG. 9, a character string 527 indicating that the device name is being updated, in the "Device Name Setup" window 521.

Figure 10:
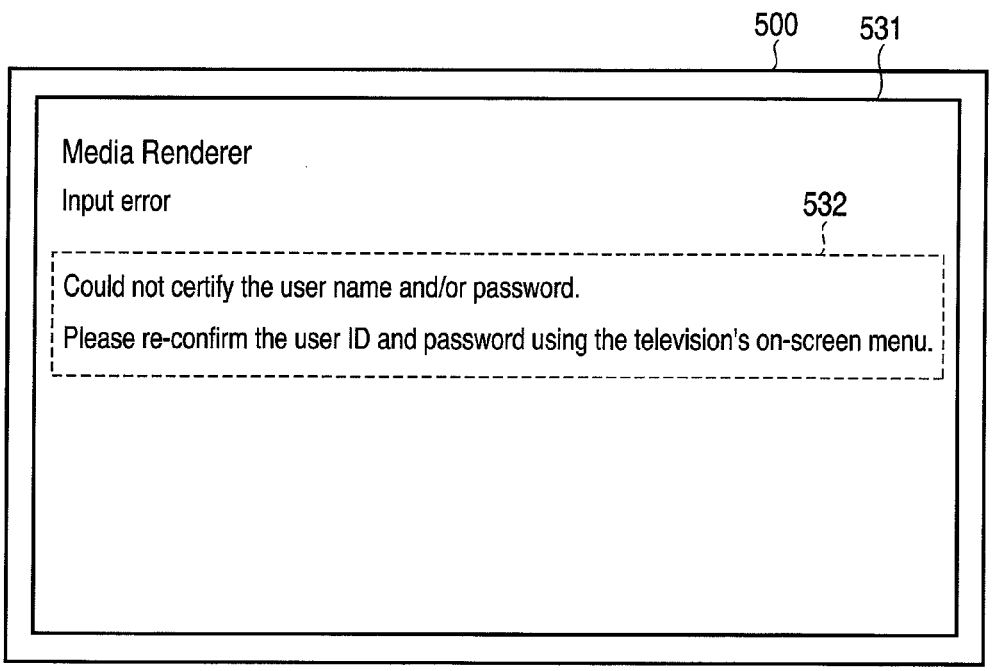
FIG. 10 is an exemplary view for explaining a further device-name setting process performed in the broadcast data receiving apparatus according to the embodiment.

The character data input in the input column 523 may contains, for example, characters that cannot be used. If this is the case, the PC 500 displays an "Input error" window 531 shown in FIG. 10. The PC 500 displays a character string 532 instructing the user to input the correct data, in the "Input error" window 531.

Figure 11:
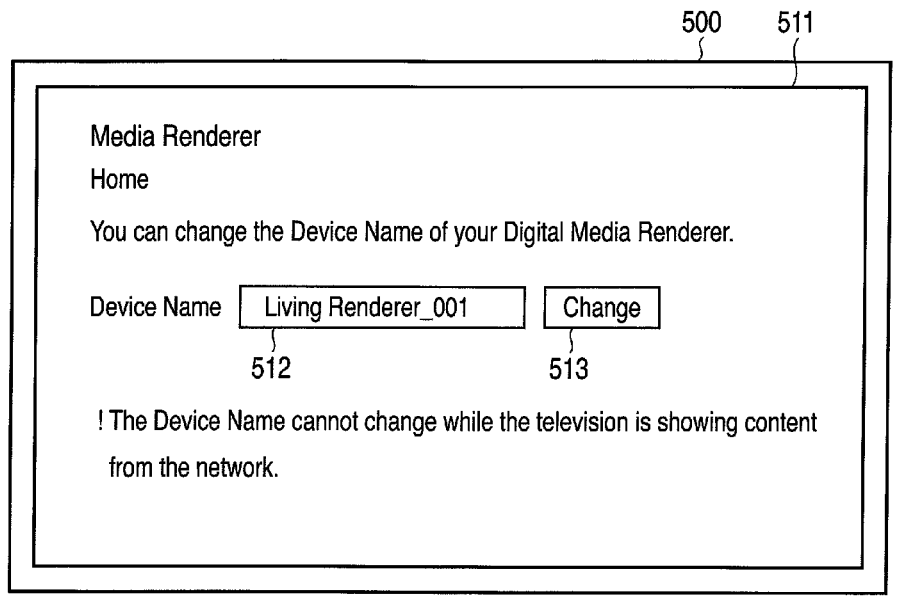
FIG. 11 is an exemplary view for explaining another device-name setting process performed in the broadcast data receiving apparatus according to the embodiment.

If a new device name is correctly transmitted to the broadcast data receiving apparatus 100, the PC 500 will control the display module, causing the same to display a "Home" window 511 shown in FIG. 11.

As shown in FIG. 11, the PC 500 displays the new device name set in the device-name display column 512. Having performed the process described above, the PC 500 functioning as DMC can set the device name of the broadcast data receiving apparatus 100, in accordance with the operating signal the user has input.

Each of the aforementioned windows is displayed as the PC 500 opens an html file. That is, any character string displayed in the window is contained in the html file. In the broadcast data receiving apparatus 100 according to the present embodiment, the ROM 151 stores a plurality of html files written in different languages.

Figure 12:
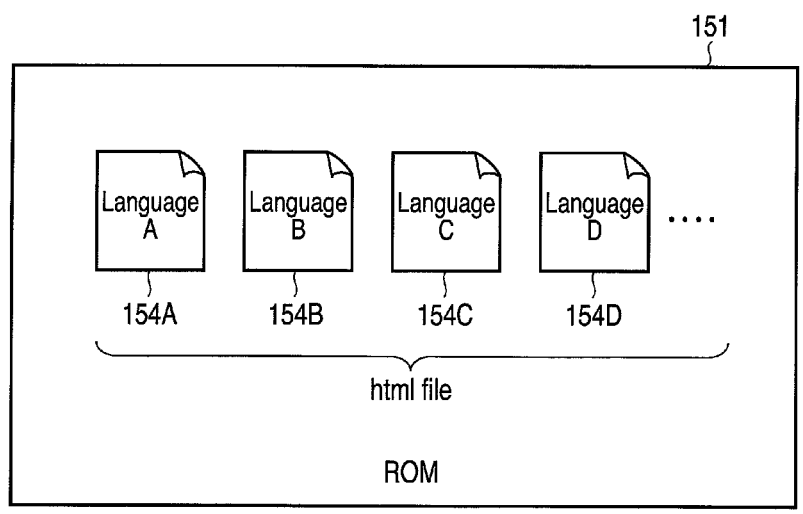
FIG. 12 is an exemplary view for explaining files stored in the ROM incorporated in the broadcast data receiving apparatus according to the embodiment.

FIG. 12 is a view for explaining the html files stored in the ROM 151 of the broadcast data receiving apparatus 100.

As shown in FIG. 12, the ROM 151 holds an html file 154A associated with language A, an html file 154B associated with language B, an html file 154C associated with language C, and an html file 154D associated with language D. In each of these html files, the character string is of the specific language. Thus, the ROM 151 functions as storage module storing a plurality html files associated with different languages, respectively. The ROM 151 may hold other html files associated with other languages, respectively.

FIG. 13 is a view for explaining a method of controlling the broadcast data receiving apparatus 100.

As described above, the user may operates the PC 500 to transmits, to the broadcast data receiving apparatus 100, a file request for an html file which will be used to change the device name of the broadcast data receiving apparatus 100. If so operated, the PC 500 generates a display language request in accordance with the setting of, for example, a browser. The PC 500 transmits the display language request generated, together with the html file request, to the broadcast data receiving apparatus 100.

On receiving the display language request and the html file request, the MPU 150 of the broadcast data receiving apparatus 100 recognizes the language the user wants, on the basis of the display language request. The MPU 150 then reads from the ROM 151 the html file associated with the language thus recognized. The broadcast data receiving apparatus 100 transmits the html file, thus read, to the PC 500 through the network 1.

The ROM 151 may store no html files associated with the language recognized. If this is the case, the broadcast data receiving apparatus 100 transmits the html file associated with the default language, which has been set, to the PC 500. The data about the setting of the default language is stored in, for example, the ROM 151 or the EEPROM 153. If the default language is English, the broadcast data receiving apparatus 100 will transmits the html file associated with English to the PC 500.

The broadcast data receiving apparatus 100 may be configured to set an html file to transmit to the PC 500 if the ROM 151 stores no html files associated with the language recognized, and be configured to determine the language associated with the html file to transmit to the PC 500, from the data about the setting of the default language.

The user who operates the PC 500 can therefore browse any desired html files. That is, it is easy for the user to review the page for changing the device name of the broadcast data receiving apparatus 100, and to operate the PC 500 in order to change the device name of the broadcast data receiving apparatus 100. Hence, this embodiment can provide a broadcast data receiving apparatus and a method of controlling the apparatus, which are user-friendly.

Another method of controlling the broadcast data receiving apparatus 100 will be described.

FIG. 14 is a view for explaining the other method of controlling the broadcast data receiving apparatus 100.

The broadcast data receiving apparatus 100 shown in FIG. 14 has a language setting file 155 stored in the EEPROM 153. That is, the EEPROM 153 functions as storage module that holds a language setting file (language setting data). The language setting file 155 is data representing the language in which to display the menu in accordance with the user's instruction. More precisely, the MPU 150 of the broadcast data receiving apparatus 100 recognizes the language that the language setting file 155 designates, and causes the display module 300 to display various character strings in the language recognized.

Assume that the broadcast data receiving apparatus 100 shown in FIG. 14 receives a display language request and an html file request from the PC 500. Then, the broadcast data receiving apparatus 100 recognizes the language the user wants, on the basis of the display language request. In the broadcast data receiving apparatus 100, the MPU 150 determines whether the display language the PC 500 has requested for is identical to the language designated by the language setting file 155.

The display language the PC 500 has requested for may be identical to the language designated by the language setting file 155. In this case, the MPU 150 reads, from the ROM 151, the html file associated with the display language requested for by the PC 500. The MPU 150 then transmits this html file to the PC 500 through the network 1.

The display language the PC 500 has requested for may not be identical to the language designated by the language setting file 155. If this is the case, the MPU 150 reads, from the ROM 151, the html file associated with the language designated by the language setting file 155. The MPU 150 then transmits this html file to the PC 500 through the network 1.

The EEPROM 153 of the broadcast data receiving apparatus 100 may store priority setting data. In this case, the EEPROM 153 functions as storage module that stores the priority setting data. The priority setting data is data showing which language, the display language requested for by any apparatus connected to the network 1 or the language designated by the language setting file 155, should be selected, if these languages are not identical.

If the priority setting data shows that the display language requested for by an apparatus connected the network 1 should be set first, the MPU 150 will transmit to the PC 500 the html file associated with the display language requested for by the PC 500. On the other hand, if the priority setting data shows that the language designated by the language setting file 155 should be set first, the MPU 150 will transmit, to the PC 500, the html file associated with the language designated by the language setting file 155.

The broadcast data receiving apparatus 100 can therefore transmit an html file of the language desirable for the user, to the PC 500 being operated by the user. Thus, the user can easily review the for changing the device name of the broadcast data receiving apparatus 100, and to operate the PC 500 to change the device name of the broadcast data receiving apparatus 100. Hence, this embodiment can also provide a broadcast data receiving apparatus and a method of controlling the apparatus, which are user-friendly.

In the embodiments described above, three apparatuses exist in the network 1, i.e., broadcast data receiving apparatus 100, data record/playback apparatus 400 and PC 500. However, this embodiment is not limited to this configuration. The network 1 may be the constitution that apparatuses comprising the function of DLNA are connected to more. In the network 1, there may be a plurality of Daces, a plurality of Dams and a plurality of Mrs.

In the embodiments described above, the broadcast data receiving apparatus 100 is so configured that the ROM 151 stores a plurality of html files that are associated with different languages, respectively, and used to change the device name of the broadcast data receiving apparatus 100. Nonetheless, the broadcast data receiving apparatus 100 can be configured so that the storage module for storing html files may be other than the ROM 151. For example, the EEPROM 153 may store the html files.

In the embodiments described above, the html file is one that is used to change the device name of the broadcast data receiving apparatus 100. However, the html files may instead be, for example, a page describing the specification of the broadcast data receiving apparatus 100, a page for giving the user various data items, or the like.

Further, the modules incorporated in the broadcast data receiving apparatus 100 may be implemented by hardware or by software. In the latter case, an operation element, such as CPU (or MPU), is utilized.

The various modules of the systems described herein can be implemented as software applications, hardware and or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a transmission and reception module configured to transmit data to an external apparatus through a network and to receive data from the external apparatus through the network;
   a device name storage module configured to store a device name;
   a first device name setting module configured to set a device name in the device name storage module based on character data input in accordance with an operation input;
   a second device name setting module configured to receive a device name from the external apparatus at the transmission and reception module, and to set a received device name in the device name storage module; and
   a controller configured to control the transmission and reception module to transmit a file, used for setting a device name and being a language associated with an acquisition request for setting a device name, to the external apparatus through the network, if the transmission and reception module receives the acquisition request from the external apparatus through the network.

2. The electronic apparatus of claim 1, further comprising:
   a first storage module configured to store different-language files each for setting a device name of the electronic apparatus in the network,
   wherein if the acquisition request is received, the controller is configured to recognize a language requested by the external apparatus based on the acquisition request, to read a file associated with the language recognized from the first storage module, and to control the transmission and reception module to transmit the file to the external apparatus through the network.

3. The electronic apparatus of claim 1, wherein if the acquisition request is received from the external apparatus, the controller is configured to read a device name stored in the device name storage module, and to control the transmission and reception module to transmit the device name to the external apparatus.

4. The electronic apparatus of claim 2, further comprising a second storage module configured to store language setting data,
   wherein the controller is configured to determine whether a language requested by the external apparatus is identical to a language indicated by the language setting data, and to read a file associated with the language indicated by the language setting data from the first storage module if the language requested by the external apparatus is not identical to the language indicated by the language setting data, and to control the transmission and reception module to transmit the file to the external apparatus.

5. The electronic apparatus of claim 2, further comprising a second storage module configured to store language setting data and a third storage module configured to store priority setting data,
   wherein the controller is configured to determine whether a language requested by the external apparatus is identical to the language indicated by the language setting data, to determine, if the display language is not identical to the language indicated by the language setting data, which language has priority, the language requested by the external apparatus or the language indicated by the language setting data, based on the priority data, to read the file associated with the language determined to have priority from the first storage module, and to control the transmission and reception module to transmit the file to the external apparatus.

6. The electronic apparatus of claim 2, wherein the controller is configured to read the file associated with a preset default language from the first storage module if the first storage module does not store a file associated with a language requested by the external apparatus, and to control the transmission and reception module to transmit the file to the external apparatus.

7. The electronic apparatus of claim 1, further comprising:
   a receiving module configured to receive a broadcast data;
   a signal processing module configured to perform a prescribed signal process on the broadcast data received by the receiving module; and
   a display module configured to display an image based on the broadcast data processed by the signal processing module.

8. A control method for an electronic apparatus comprising a transmission and reception module configured to transmit data to an external apparatus through a network and to receive data from the external apparatus through the network, and a device name storage module configured to store a device name, the method comprising:
   a first device name setting process in which a device name is set in the device name storage module based on character data input in accordance with an operation input;
   a second device name setting process in which the transmission and reception module receives a device name from the external apparatus and the received device name is set in the device name storage module; and
   a control process in which if the transmission and reception module receives an acquisition request for setting a device name from the external apparatus through a network, the transmission and reception module transmits a file, used for setting a device name and being a language associated with the acquisition request, to the external apparatus through the network,
   wherein a device name is set in the device name storage module by either the first device name setting process or the second device name setting process.

* * * * *